United States Patent
Liang et al.

(10) Patent No.: US 9,311,941 B1
(45) Date of Patent: Apr. 12, 2016

(54) ERASE COARSE GUIDE SPIRAL-BASED IN-DRIVE ERASE PROCESS

(71) Applicant: KABUSHIKI KAISHA TOSHIBA, Tokyo (JP)

(72) Inventors: Jiangang Liang, San Jose, CA (US); Ting-Chun Janet Liu, Cupertino, CA (US); Gabor Szita, Mountain View, CA (US); Gary W. Calfee, Santa Clara, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/675,507

(22) Filed: Mar. 31, 2015

(51) Int. Cl.
 *G11B 5/596* (2006.01)
 *G11B 5/024* (2006.01)
 *G11B 20/12* (2006.01)
 *G11B 5/03* (2006.01)
 *G11B 20/10* (2006.01)

(52) U.S. Cl.
 CPC ............ *G11B 5/59638* (2013.01); *G11B 5/024* (2013.01); *G11B 5/03* (2013.01); *G11B 5/59627* (2013.01); *G11B 5/59683* (2013.01); *G11B 20/1252* (2013.01); *G11B 2020/10851* (2013.01); *G11B 2020/1281* (2013.01)

(58) Field of Classification Search
 CPC ............... G11B 5/59638; G11B 5/024; G11B 20/1252; G11B 2020/10851; G11B 2020/1281; G11B 5/03; G11B 5/59683; G11B 2005/0021; G11B 5/59627; G11B 5/743; G11B 5/865; B82Y 10/00
 USPC .................................. 360/66, 67, 61, 46, 75
 See application file for complete search history.

(56) References Cited

U.S. PATENT DOCUMENTS

| 7,529,055 | B1 * | 5/2009 | Laks ................... G11B 5/59627 360/75 |
| 7,729,076 | B2 | 6/2010 | Smith et al. |
| 2007/0268619 | A1 | 11/2007 | Smith et al. |
| 2008/0028141 | A1 | 1/2008 | Kalos et al. |

* cited by examiner

*Primary Examiner* — Ali Neyzari
(74) *Attorney, Agent, or Firm* — Patterson & Sheridan, LLP

(57) ABSTRACT

In an in-drive erase process for erasing disk surfaces of a hard disk drive, erase spirals are written on multiple disk surfaces and at a different write frequency than that of other data patterns on the disk surfaces. The erase spirals written on a first disk surface can be used to control an erase process on a portion of the remaining disk surfaces. Erase spirals are then written on a different disk surface and can then be used to erase all data on the first disk surface. Consequently, even when every disk surface includes previously written data patterns that can potentially interfere with control of the erase process, the erase spirals so written can control the erase process with sufficient precision to thoroughly erase each disk surface.

20 Claims, 4 Drawing Sheets

ERASE COARSE GUIDE SPIRAL-BASED IN-DRIVE ERASE PROCESS

BACKGROUND

At various points in the manufacture and use of a hard disk drive (HDD), failures or errors can occur that generally require erasure of servo information, and/or user information extant on the recording surfaces of an HDD. For example, during manufacture, errors may occur that render an HDD unusable, but can be corrected, such as spiral write errors. In the servo self-write (SSW) process, an HDD writes servo information (such as product wedges) for each data track of each recording surface of the HDD while servoing on spiral tracks previously written on a surface of the HDD. Errors in the shape or position of these spiral tracks can prevent sufficiently accurate product wedges from being written causing the HDD to fail the SSW process. To rework an HDD that has failed to successfully complete SSW, new spiral tracks typically cannot simply be rewritten onto a surface of the HDD and the SSW process repeated. This is because obsolete spiral tracks and product wedges remaining on one or more recording surfaces of an HDD generally interfere with SSW and/or error-free operation of the HDD, even when the new spiral tracks have no errors. Consequently, the recording surfaces of an HDD are preferably erased prior to reworking or refurbishing the HDD.

External equipment may be used to thoroughly erase the surfaces of HDDs prior to repeating SSW, such as media bulk erase devices or servo-track writers. For either device, partial disassembly of the HDD to be erased is generally required, necessitating use of a clean room. Furthermore, setup and use of such external equipment for each individual HDD to be erased is time-consuming and expensive in the context of high-volume manufacturing. Accordingly, there is a need in the art for systems and methods facilitating in-drive erasure of recording surfaces in an HDD.

SUMMARY

One or more embodiments provide systems and methods for an in-drive erase process for erasing disk surfaces of a hard disk drive. Erase spirals are written on multiple disk surfaces and at a different write frequency than that of other data patterns on the disk surfaces. The erase spirals written on a first disk surface can be used to control an erase process on a portion of the remaining disk surfaces. Erase spirals are then written on a different disk surface and can then be used to erase all data on the first disk surface. Consequently, even when every disk surface includes previously written data patterns that can potentially interfere with control of the erase process, the erase spirals so written can control the erase process with sufficient precision to thoroughly erase each disk surface.

A data storage device, according to an embodiment, comprises first and second data recording surfaces, first and second write heads respectively associated with the first and second data recording surfaces, and a controller. The controller is configured to control the first write head to write a first spiral track on the first data recording surface, control the second write head, based on the first spiral track, to write an erase pattern on the second data recording surface, control the second write head to write a second spiral track on the second data recording surface, and control the first write head, based on the second spiral track, to write an erase pattern on the first data recording surface.

A method of erasing first and second data recording surfaces of a data storage device, according to an embodiment, includes the steps of writing a first spiral track on the first data recording surface, writing an erase pattern on the second data recording surface while servoing on the first spiral track, writing a second spiral track on the second data recording surface, and writing an erase pattern on the first data recording surface while servoing on the second spiral track.

BRIEF DESCRIPTION OF THE DRAWINGS

So that the manner in which the above recited features of embodiments of the invention can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
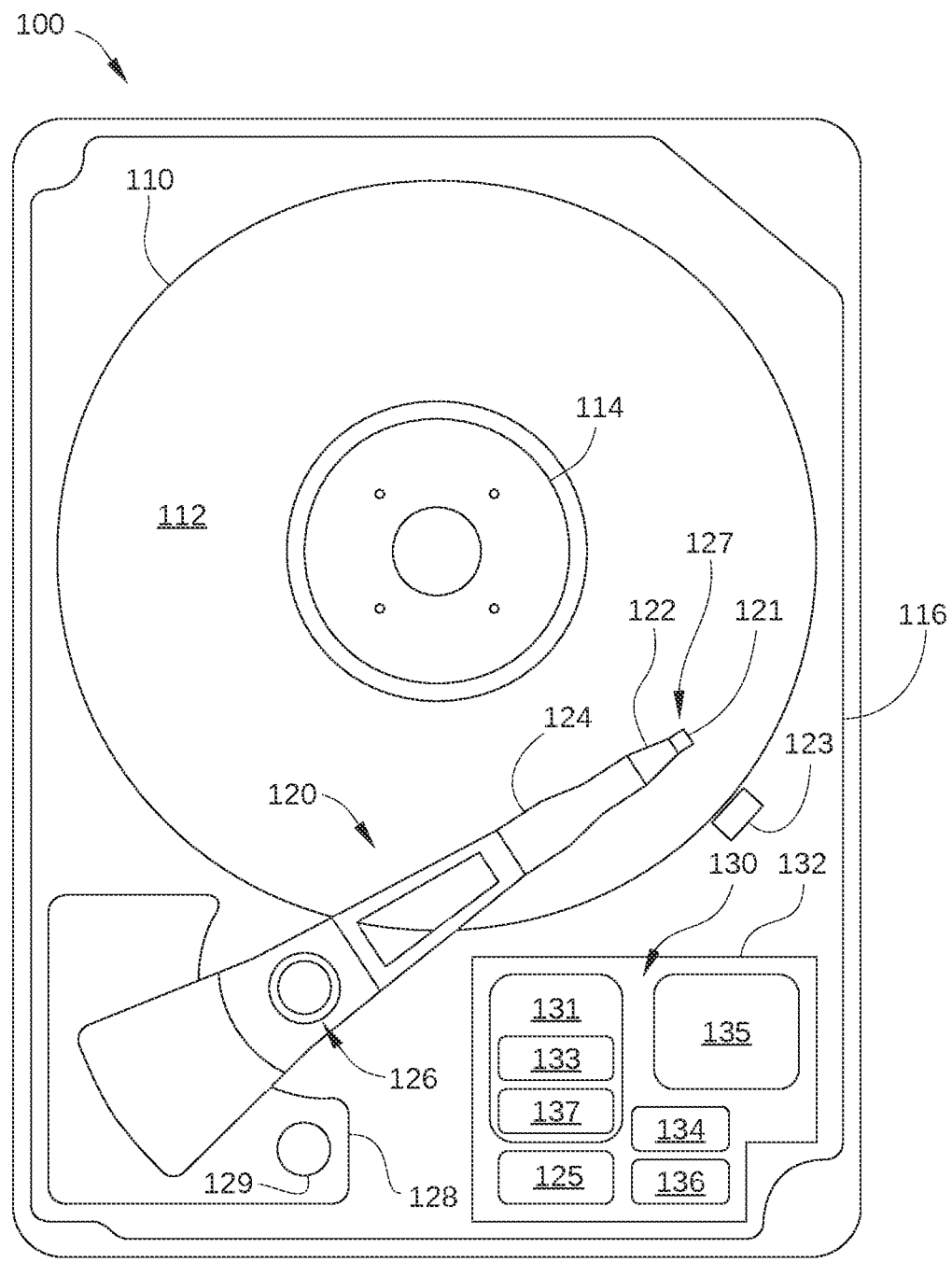
FIG. 1 is a schematic view of an exemplary hard disk drive, according to one embodiment.

FIG. 1 is a schematic view of an exemplary hard disk drive, according to one embodiment. For clarity, hard disk drive (HDD) 100 is illustrated without a top cover. HDD 100 includes multiple storage disks 110 that are rotated by a spindle motor 114. Spindle motor 114 is mounted on a base 116, and each of the multiple storage disks 110 includes a plurality of concentric data storage tracks that are disposed on a surface 112. An actuator arm assembly 120 is also mounted on base 116, and has a slider 121 mounted on a flexure arm 122 with a magnetic read/write head 127 that reads data from and writes data to the data storage tracks. Flexure arm 122 is attached to an actuator arm 124 that rotates about a bearing assembly 126. Voice coil motor 128 moves slider 121 relative to storage disks 110, thereby positioning a corresponding read/write head 127 over a desired concentric data storage track of a particular storage disk 110. Spindle motor 114, read/write head 127, and voice coil motor 128 are coupled to electronic circuits 130, which are mounted on a printed circuit board 132.

Electronic circuits 130 include a read channel 137, a microprocessor-based controller 133, random-access memory (RAM) 134 (which may be a dynamic RAM and is used as a data buffer) and/or a flash memory device 135 and a flash manager device 136. In some embodiments, read channel 137 and microprocessor-based controller 133 are included in a single chip, such as a system-on-chip 131. In some embodiments, HDD 100 may further include a motor-driver chip that accepts commands from microprocessor-based controller 133 and drives both spindle motor 114 and voice coil motor 128. Read/write channel 137 communicates with the read/write head 127 via a preamplifier (not shown) that may be mounted on a flex-cable that is itself mounted on either base 116, actuator arm 120, or both.

HDD 100 also includes an inner diameter (ID) crash stop 129 and a load/unload ramp 123. ID crash stop 129 is configured to restrict motion of actuator arm assembly 120 to preclude damage to read/write head 127 and/or storage disk 110. Load/unload ramp 123 is typically disposed proximate the outer diameter (OD) of storage disks 110 and is configured to unload read/write head 127 from storage disks 110. Typically, at the beginning of a self servo writing (SSW) process, actuator arm assembly 120 is pushed against ID crash stop 129, so that ID crash stop 129 may serve as a position reference at the start of the SSW process.

For clarity, HDD 100 is illustrated with a single storage disk 110 and a single actuator arm assembly 120. In practice, HDD 100 typically includes multiple storage disks and multiple actuator arm assemblies. In addition, each side of the storage disks 110 generally has a corresponding read/write head (similar to read/write head 127) associated therewith and coupled to a flexure arm (similar to flexure arm 122). One embodiment of the multiple storage disks and associated read/write heads of HDD 100 is illustrated in FIG. 2.

Figure 2:
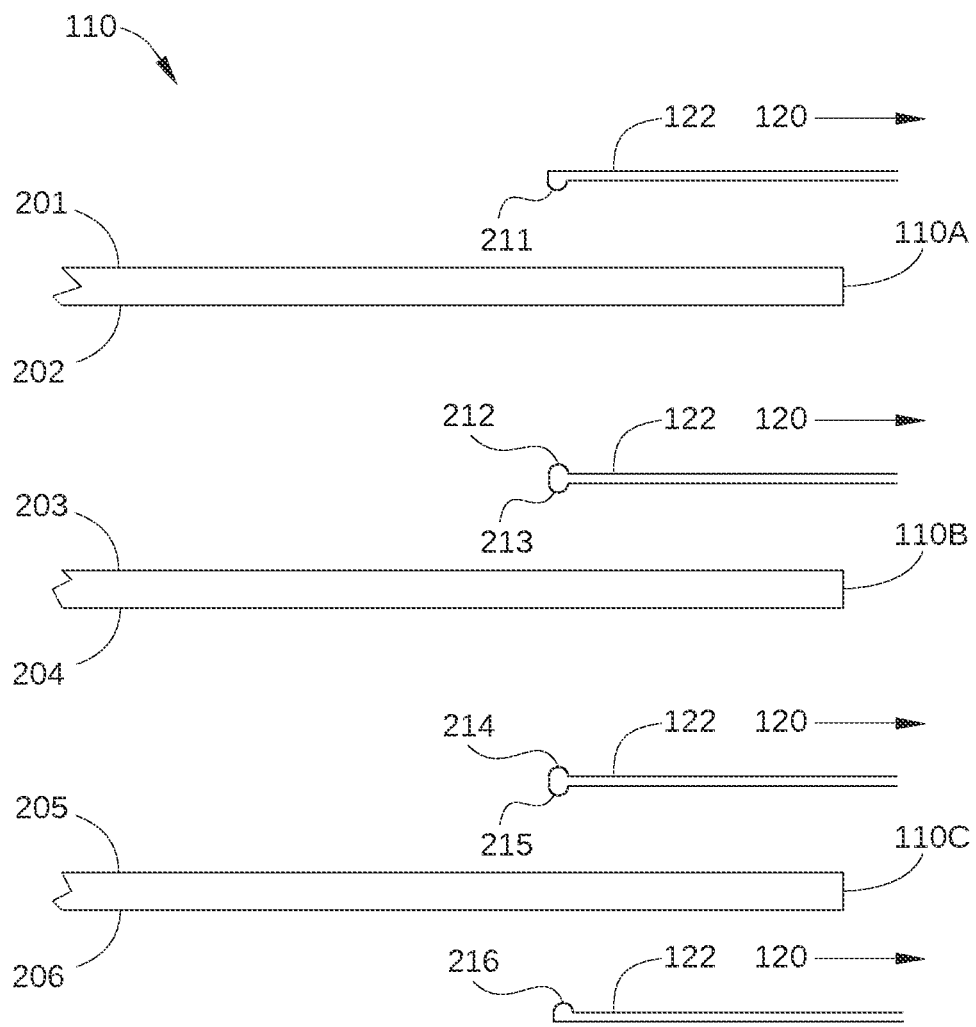
FIG. 2 schematically illustrates a partial side-view of a hard disk drive configured with multiple storage disks and multiple read/write heads, according to an embodiment.

FIG. 2 schematically illustrates a partial side-view of HDD 100 configured with multiple storage disks 110A, 110B, and 110C and multiple read/write heads 211-216, according to an embodiment. Each read/write head of HDD 100 is associated with one data recording surface of one of storage disks 110A, 110B, and 110C. Specifically, read/write heads 211-216 are associated with disk surfaces 201-206, respectively. Thus, read/write head 211 reads data from and writes data to corresponding disk surface 201, read/write head 212 reads data from and writes data to corresponding disk surface 202, read/write head 213 reads data from and writes data to corresponding disk surface 203, and so on.

When data are transferred to or from one of storage disks 110A-C, actuator arm assembly 120 sweeps an arc between the ID and the OD of storage disks 110A-C. Actuator arm assembly 120 accelerates in one angular direction when current is passed in one direction through the voice coil of voice coil motor 128 and accelerates in an opposite direction when the current is reversed, thereby allowing control of the position of actuator arm assembly 120 and attached read/write heads 211-216 with respect to storage disks 110A-C. Voice coil motor 128 is coupled with a servo system known in the art that uses the positioning data read from servo wedges on one of storage disks 110A-C by the corresponding read/write head 211, 212, 213, 214, 215, or 216 to determine the position of that read/write head over a specific data storage track. The servo system determines an appropriate current to drive through the voice coil of voice coil motor 128, and drives said current using a current driver and associated circuitry.

In order for HDD 100 to perform SSW, position and timing information are provided to the servo system of HDD 100 so that HDD 100 can write servo wedges onto each of storage disks 110A-C with the necessary precision for proper operation of HDD 100. Servo wedges generally contain servo information that is located in servo sectors of the concentric data storage tracks on storage disks 110A-C and is read by the appropriate read/write head during read and write operations to position the read/write head above a desired data storage track. The position and timing information that enables the internal servo system of HDD 100 to perform SSW is typically in the form of reference spiral tracks that are written on one or more of disk surfaces 201-206, and are referred to as "servo spirals." During the SSW process, for each of disk surfaces 201-206, the corresponding read/write head is positioned relative to the disk surface based on the servo spirals, so that the final servo information on each disk surface can be written by the corresponding disk drive head.

According to some embodiments, an in-drive erase process that is in some ways similar to the SSW process is enabled via servo spirals written on one or more of disk surfaces 201-206 of HDD 100. These servo spirals are referred to herein as "erase spirals." Unlike conventional servo spirals, erase spirals are written onto one or more of disk surfaces 201-206 after HDD 100 has begun or completed SSW. One embodiment of such erase spirals is illustrated in FIG. 3.

Figure 3:
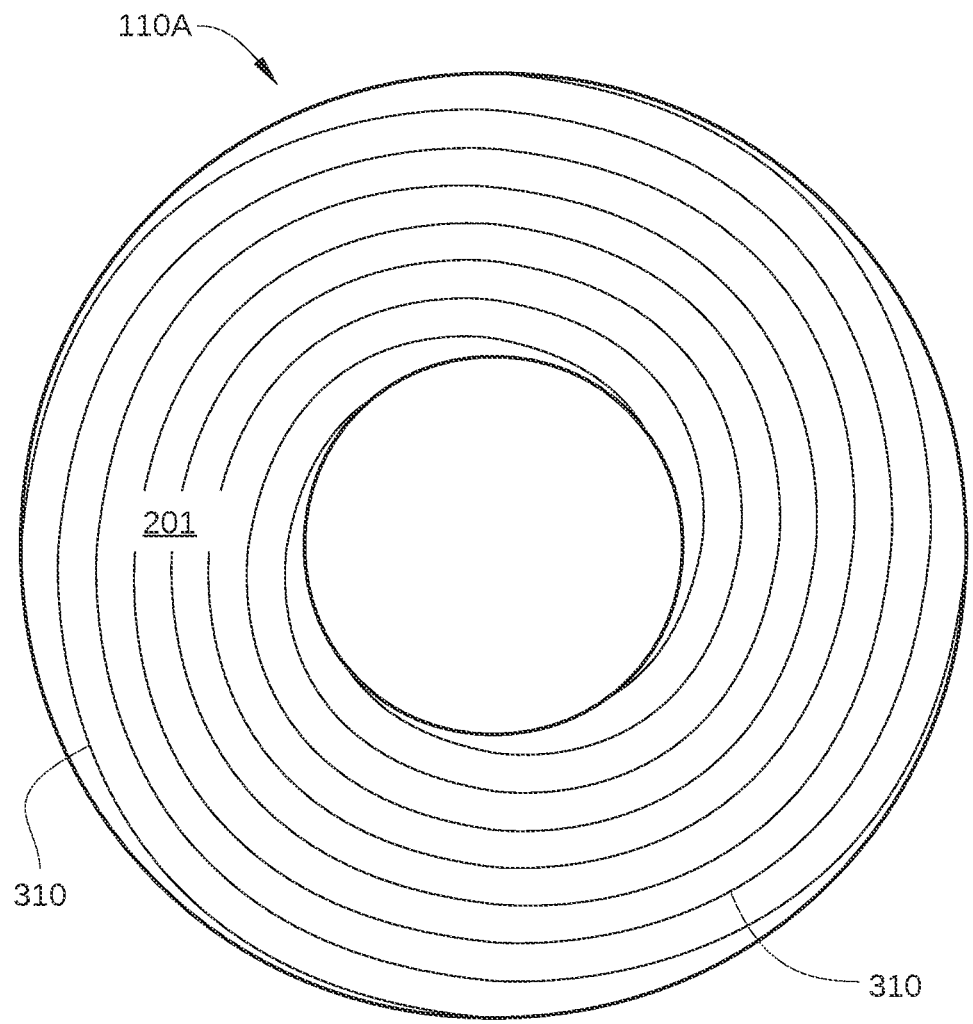
FIG. 3 illustrates one of the storage disks of the hard disk drive of FIG. 1 prior to undergoing an in-drive erase process, according to one embodiment.

FIG. 3 illustrates one of storage disks 110 prior to undergoing an in-drive erase process, according to one embodiment. As shown, storage disk 110A (in one example) has a plurality of erase guide spirals (EGSs) 310 written thereon that are circumferentially spaced apart from adjacent EGSs 310. EGSs 310 may be written on disk surface 201 of storage disk 110A by any technically feasible approach or combination of approaches. For example, in some embodiments, EGSs 310 are "bootstrap spirals" or "seed spirals," which are servo spirals written onto disk surface 201 of storage disk 110A using read/write head 211 and the servo system of HDD 100. Thus, EGSs 310 may be written without external actuators and without disassembly of HDD 100. According to some embodiments, EGSs 310 are employed as coarse guide spirals that enable an in-drive erase process using closed-loop control in the servo system of HDD 100. That is, an erase pattern can be written while the servo system of HDD 100 uses closed-loop tracking of EGSs 310. It is noted that the number of EGSs 310 written on storage disk 110A prior to the SSW process may be larger than that shown in FIG. 3, for example 10, 20, 30, or more.

Various in-drive procedures are known in the art for writing bootstrap spirals on disk surface 201, including the use of open-loop and/or closed-loop control of read/write head 211. In practice, such procedures may not generate the high quality servo spirals that are typically employed for an error-free and robust SSW process, i.e., spirals that are evenly spaced circumferentially and with precise and constant slope. However, an in-drive erase process is a significantly lower tolerance process than an SSW process. Specifically, during SSW, precise positioning of the write head during each revolution of the recording media is critical for forming product wedges that provide error-free operation of the HDD. By contrast, during in-drive erase, imprecise positioning of the write head while servoing on EGSs 310 can be readily compensated for, so that the media surface being treated is thoroughly erased.

For example, in some embodiments, while servoing over the same radial location, i.e., over the same concentric data storage track, the erase process may be performed for multiple revolutions. Additionally or alternatively, for each revolution (or set of revolutions) of the media, the read/write head may radially seek across the media for a distance that is less than the width of a data storage track of the HDD, such as one half of track width, one third of a track width, or less. In this way, the write head performing the erase process will pass over or near any particular point on the surface of the media multiple times, thereby greatly increasing the probability that all surfaces of the media are thoroughly erased. Thus, while EGSs 310 may not be as closely spaced and accurately positioned as servo spirals used for the SSW process, complete or nearly complete erasure of a recording surface in HDD 100 can be achieved.

In some embodiments, the duration of an erase process that employs EGSs 310 can be significantly reduced by writing a greater total number of EGSs 310 on a particular storage disk 110 than the number of coarse guide spirals typically written on a storage disk 110 for SSW. The greater number of coarse guide spirals may be more closely spaced circumferentially than typical coarse guide spirals. In some embodiments, EGSs 310 are written with smaller circumferential spacing by writing each individual EGS 310 with a higher radial velocity than the radial velocity typically employed for writing SSW coarse guide spirals, so that EGSs 310 have a higher slope than SSW coarse guide spirals. With more closely spaced EGSs 310, a higher bandwidth EGS servo loop is enabled for an erase process, improving track mis-registration (TMR) and reducing the overall time of the erase process.

In some embodiments, EGSs 310 are written on a substantially blank surface of HDD 100. For example, when HDD 100 fails to successfully complete SSW, one or more of disk surfaces 201-206 may have no spiral tracks, product wedges, or user data or other data written thereon. In other embodiments, EGSs 310 may be formed on a disk surface that has previously written patterns thereon. For example, HDD 100 may fail a self-test or experience some other fault after completion of SSW, in which case each of disk surfaces 201-206 has product wedges, and in some instances user data, written thereon. These previously written data patterns can interfere with the in-drive erase process. Consequently, in some embodiments, EGSs 310 are written with a signal frequency that is selected to be different than any signal frequency associated with data patterns previously written on that data recording surface.

For example, in an embodiment of HDD 100 in which previously written coarse guide spirals or bootstrap spirals are formed with a write frequency of approximately 125 MHz, product servo wedges are formed with a write frequency of approximately 175 MHz, and user data have a write frequency of approximately 500 MHz, EGSs 310 may be formed on one of disk surfaces 201-206 with a write frequency of approximately 200 MHz. In this way, during an in-drive erase process, the servo system of HDD 100 can be tuned to substantially ignore any signals read by a read/write head that have a frequency significantly different than 200 MHz. Thus, even though EGSs 310 are written on a disk surface of HDD 100 that has a significant quantity of previously written user and servo data written thereon, the in-drive erase process can be performed with little or no interference from such previously written data.

Figure 4:
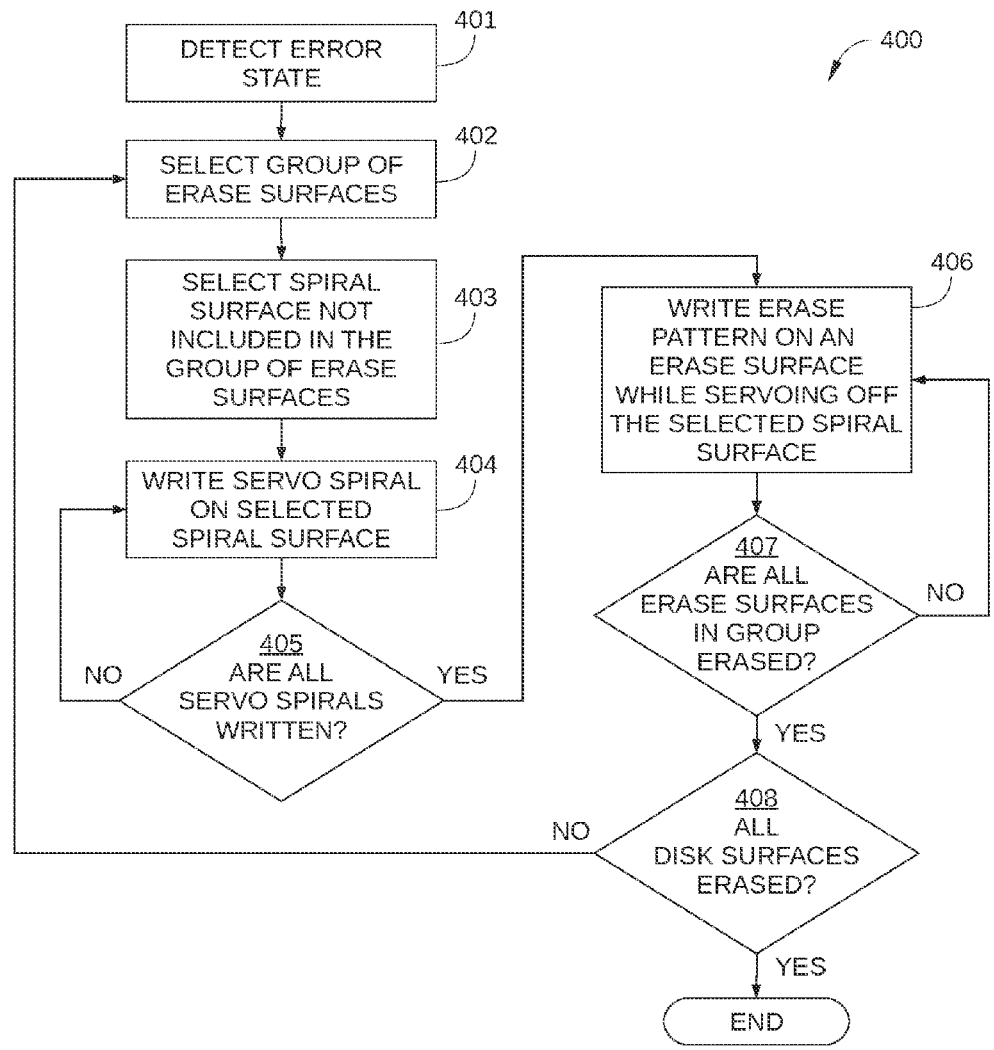
FIG. 4 sets forth a flowchart of method steps for an in-drive erase process, according to an embodiment.

FIG. 4 sets forth a flowchart of method steps for an in-drive erase process, according to an embodiment. Although the method steps are described in conjunction with HDD 100 in FIGS. 1-3, persons skilled in the art will understand that the method steps may be performed with other data storage devices. The control algorithms for the method steps may reside in and/or be performed by microprocessor-based controller 133, flash manager device 136, any other suitable control circuit or system, or, in some embodiments, an external host device that is temporarily coupled to HDD 100.

Prior to the method steps, a target number of EGSs 310 to be formed for performing an in-drive erase process in HDD 100 is determined, for example 10, 20, 30 or more. In addition, the current state of disk surface 201-206 may be determined, either by HDD 100 or by an external host that provides such information to microprocessor-based controller 133. For example, some of disk surfaces 201-206 may have no data written thereon, others may have complete or incomplete SSW guide spirals written thereon, others may have partial or complete product wedges written thereon, and/or others may have user data written thereon.

As shown, method 400 begins at step 401, where microprocessor-based controller 133 detects an error state in HDD 100. For example, microprocessor-based controller 133 may fail a self-test, such as that performed upon completion of SSW, indicating that SSW must be performed again and erasure of disk surfaces 201-206 should therefore be initiated. In another example, microprocessor-based controller 133 may receive a signal from an external host indicating that HDD 100 has suffered a fault requiring erasure of disk surfaces 201-206.

In step 402, microprocessor-based controller 133 selects a group of erase surfaces, i.e., disk surfaces to be erased. Typically in an erase process, one read/write head (e.g., read/write head 211) servos on EGSs 310, which are written on one disk surface of HDD 100 (e.g., disk surface 201). Simultaneously, another read/write head (e.g., read/write head 213) writes the desired erase pattern on another disk surface (e.g., disk surface 203). Thus, in step 402, microprocessor-based controller 133 selects a group of erase surfaces that do not include a surface on which EGSs 310 are subsequently written for facilitating erasure of the group of erase surfaces. For example, in an embodiment in which some of disk surfaces 201-206 are free or substantially free of previously written spiral tracks or other data, microprocessor-based controller 133 selects a group of erase surfaces in step 402 that does not include at least one of the disk surfaces that is substantially free of previously written data. In this way, EGSs 310 can be written on a clean disk surface.

Generally, the group of erase surfaces selected in step 402 does not include disk surfaces that have previously undergone the in-drive erase process of method 400. Furthermore, in some embodiments, the group of erase surfaces selected in step 402 may include only disk surfaces that have previously written data thereon, since there is generally no need to erase a disk that has not been previously written to. In some embodiments, the group of erase surfaces includes half of the disk surfaces 201-206, in which case the in-drive erase process described in method 400 can be completed in two erase groups.

In step 403, microprocessor-based controller 133 selects a spiral surface not included in the group of erase surfaces. The spiral surface is a disk surface on which EGSs 310 are to be written. In some embodiments, the disk surface selected in step 403 is a disk surface, if available, that has little or no previously written data thereon. Thus, in such embodiments, microprocessor-based controller determines that a particular disk surface is free of previously written data as part of step 403. In other embodiments, the disk surface selected in step 403 may be any remaining disk surface of HDD 100.

In step 404, microprocessor-based controller 133 causes one EGS 310 to be written on the spiral surface selected in step 403. For example, microprocessor-based controller 133 controls the read/write head associated with the spiral surface to write a spiral track on the spiral surface. As noted previously, procedures known in the art for writing a bootstrap or seed spiral on a disk surface may be employed by HDD 100 to write the spiral track in step 404. In some embodiments, microprocessor-based controller 133 controls the read/write head associated with the spiral surface head to write the EGS 310 (and subsequent EGSs 310) by moving the read/write head across the spiral surface with a particular radial velocity profile. In some embodiments, the EGS 310 is written on the spiral surface using a write frequency that is a different frequency than any signal frequency associated with data patterns previously written on the spiral surface. Thus, the signal frequency associated with EGSs 310 is a different frequency than that generated by any data patterns previously written on the spiral surface. In step 405, microprocessor-based controller 133 determines whether all EGSs 310 are written on the spiral surface. If no, method 400 proceeds back to step 404, in which another EGS 310 is written to the spiral surface; if yes, method 400 proceeds to step 406.

In step 406, microprocessor-based controller 133 writes an erase pattern on an erase surface in the group of erase surfaces selected in step 402. The erase pattern, such as a pattern corresponding to alternating 0's and 1's, is written on the erase surface with the read/write head associated with the erase surface while the read/write head associated with the spiral surface servos on EGSs 310. In some embodiments, the erase pattern is written over multiple revolutions to the same radial location to ensure more complete erasure of existing data patterns on the erase surface. In other embodiments, the read/write head associated with the erase surface seeks across the erase surface in radial steps that are significantly smaller than the track pitch of data storage tracks on the erase surface, so that each data storage track is nominally passed over multiple times by the read/write head performing the erase process. In either case, erasure of the erase surface can be completed with a single track-by-track seek that is either performed from an inner diameter to an outer diameter of the erase surface, or from the outer diameter to the inner diameter of the erase surface.

In step 407, microprocessor-based controller 133 determines whether all erase surfaces in the group of erase surfaces are erased. If no, method 400 proceeds back to step 406, in which another erase surface in the group of erase surfaces has an erase pattern written thereon; if yes, method 400 proceeds to step 408. In step 408, microprocessor-based controller 133 determines whether all of disk surfaces 201-206 have been erased. If no, method 400 proceeds back to step 402, in which another group of erase surfaces is selected; if yes, method 400 ends. HDD 100 can then begin a conventional SSW process.

Thus, method 400 enables an in-drive erase process by which all disk surfaces can be erased, even when every disk surface includes previously written data patterns that can potentially interfere with control of the erase process. Because the erase spirals used for controlling the erase process may be written with a different write frequency than such previously written data patterns, the previously written data patterns have little or no effect on control of the in-drive erase process. In addition, by writing erase spirals on more than one disk surface of the hard drive, an erase pattern can be written to all disk surfaces, even the disk surface used to control writing of the erase pattern on a first group of disk surfaces.

In sum, embodiments described herein provide systems and methods for an in-drive erase process for erasing disk surfaces of a hard disk drive. By writing erase spirals on multiple disk surfaces and at a different write frequency than that of other data patterns on the disk surfaces, every disk surface can be thoroughly erased, even though a relatively small number of erase spirals is used that may not be ideally shaped or positioned.

While the foregoing is directed to embodiments of the present invention, other and further embodiments of the invention may be devised without departing from the basic scope thereof, and the scope thereof is determined by the claims that follow.

We claim:

1. A data storage device comprising:
   first and second data recording surfaces;
   first and second write heads respectively associated with the first and second data recording surfaces;
   a controller configured to:
   control the first write head to write a first spiral track on the first data recording surface;
   control the second write head, based on the first spiral track, to write an erase pattern on the second data recording surface;
   control the second write head to write a second spiral track on the second data recording surface; and
   control the first write head, based on the second spiral track, to write an erase pattern on the first data recording surface.

2. The data storage device of claim 1, wherein the erase pattern is written on the second data recording surface while the first write head servos on the first spiral track.

3. The data storage device of claim 2, wherein the erase pattern is written on the second data recording surface one track at a time while the second write head moves from an inner diameter of the second data recording surface to an outer diameter of the second data recording surface or from the outer diameter of the second data recording surface to the inner diameter of the second data recording surface.

4. The data storage device of claim 1, wherein the controller is configured to control the second write head based on the first spiral track by servoing the second write head using the first spiral track.

5. The data storage device of claim 1, wherein a signal frequency associated with the first spiral track is a different frequency than any signal frequency associated with patterns previously written on the first data recording surface, and a signal frequency associated with the second spiral track is a different frequency than any signal frequency associated with patterns previously written on the first data recording surface.

6. The data storage device of claim 5, wherein the patterns written on the first data recording surface include at least one of spiral tracks, product wedges, other servo data, or user data.

7. The data storage device of claim 1, wherein the controller is further configured to control a third write head, based on the first spiral track, to write an erase pattern on a third data recording surface of the data storage device.

8. The data storage device of claim 1, wherein the controller is further configured to:
   prior to controlling the first write head to write the first spiral track, determine that the first data recording surface is free of previously written spiral tracks; and
   based on the first data recording surface track being free of previously written spiral tracks, selecting the first data recording surface to have the first spiral track written thereon.

9. The data storage device of claim 1, wherein the controller is configured to control the first write head to write the first spiral track by moving the first write head across the first data recording surface with a particular radial velocity profile and to write the second spiral track by moving the second write head across the second data recording surface with the particular radial velocity profile.

10. The data storage device of claim 1, wherein the controller is configured to control the second write head to write the erase pattern at a particular radial location on the second data recording surface for multiple revolutions of the second data recording surface.

11. A method of erasing first and second data recording surfaces of a data storage device, said method comprising:
   writing a first spiral track on the first data recording surface;
   while servoing on the first spiral track, writing an erase pattern on the second data recording surface;
   writing a second spiral track on the second data recording surface; and while servoing on the second spiral track, writing an erase pattern on the first data recording surface.

12. The method of claim 11, wherein writing the erase pattern on the second data recording surfaces includes:
    writing the erase pattern at a first radial location on the second data recording surface for at least one revolution of the second data recording surface;
    seeking to a second radial location on the second data recording surface, wherein the second radial location is less than one track width from the first radial location; and
    writing the erase pattern at the second radial location for at least one revolution of the second data recording surface.

13. The method of claim 11, wherein the erase pattern is written on the second data recording surface while the first write head servos on the first spiral track.

14. The method of claim 13, wherein the erase pattern is written on the second data recording surface one track at a time while the second write head moves from an inner diameter of the second data recording surface to an outer diameter of the second data recording surface or from the outer diameter of the second data recording surface to the inner diameter of the second data recording surface.

15. The method of claim 11, wherein a signal frequency associated with the first spiral track is a different frequency than any signal frequency associated with patterns previously written on the first data recording surface and a signal frequency associated with the second spiral track is a different frequency than any signal frequency associated with patterns previously written on the first data recording surface.

16. The method of claim 15, wherein the patterns written on the first data recording surface include at least one of spiral tracks, product wedges, other servo data, or user data.

17. The method of claim 11, further comprising:
    while servoing on the first spiral track, writing an erase pattern on a third data recording surface of the data storage device.

18. The method of claim 11, further comprising:
    prior to writing the first spiral track, determining that the first data recording surface is free of previously written spiral tracks; and
    based on the first data recording surface track being free of previously written spiral tracks, selecting the first data recording surface to have the first spiral track written thereon.

19. The method of claim 11, wherein
    writing the first spiral track comprises moving the first write head across the first data recording surface with a particular radial velocity profile, and
    writing the second spiral track comprises moving the second write head across the second data recording surface with the particular radial velocity profile.

20. The method of claim 11, wherein the erase pattern is written at a particular radial location on the second data recording surface for multiple revolutions of the second data recording surface.

* * * * *